Feb. 4, 1958 E. STOLL 2,821,906
BALE TYING MECHANISM
Filed Aug. 26, 1954 7 Sheets-Sheet 7
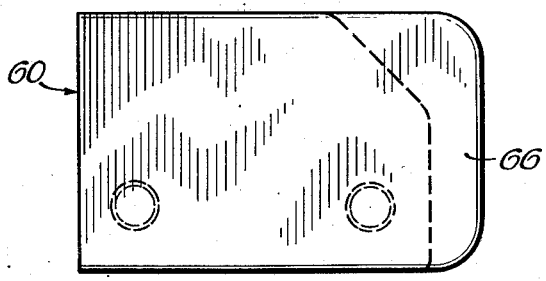
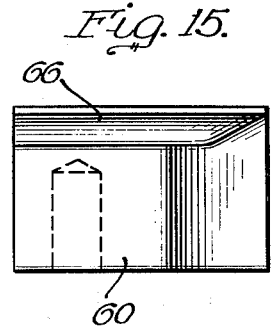
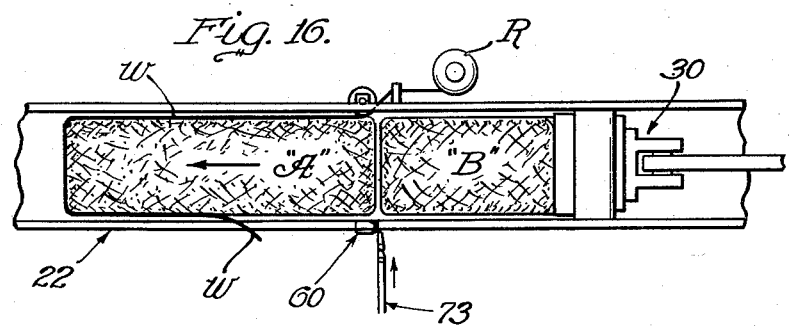
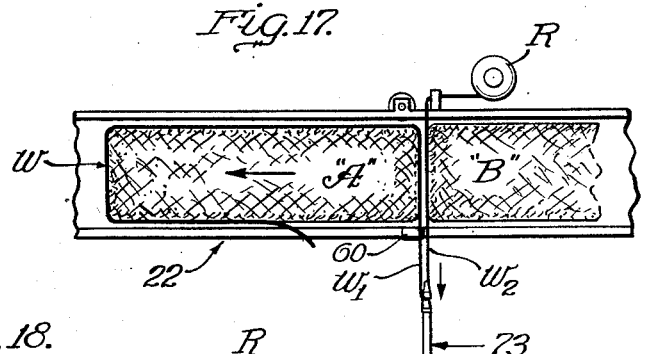
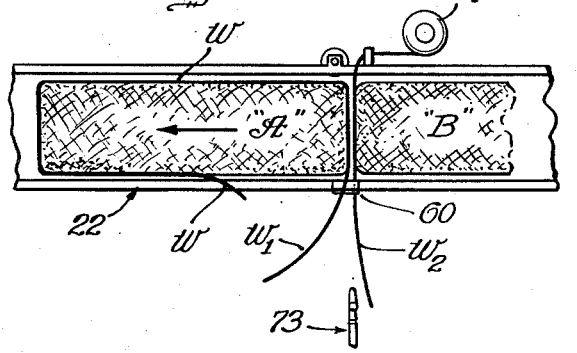
INVENTOR.
Emil Stoll
BY
Soans, Glaister & Anderson
Attys.

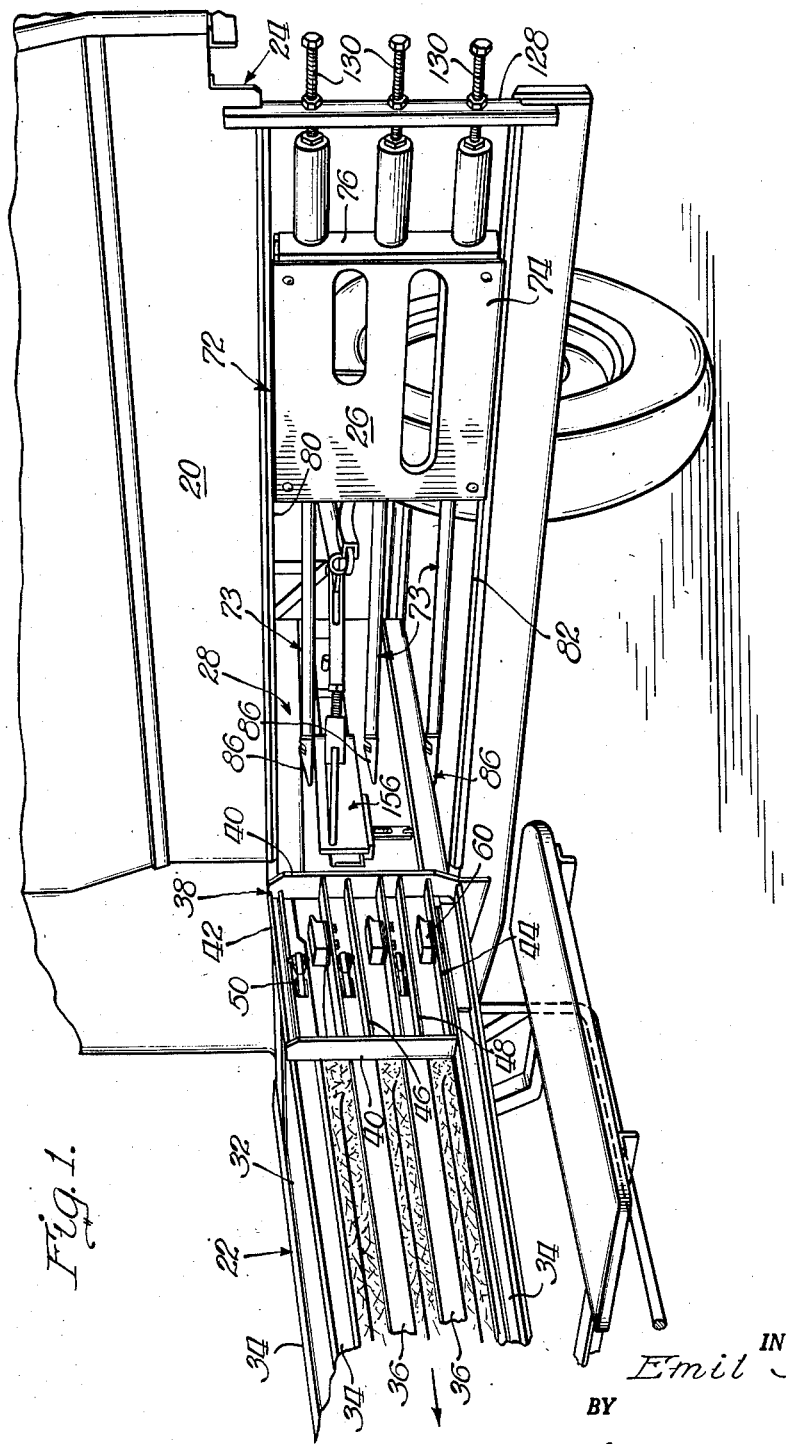

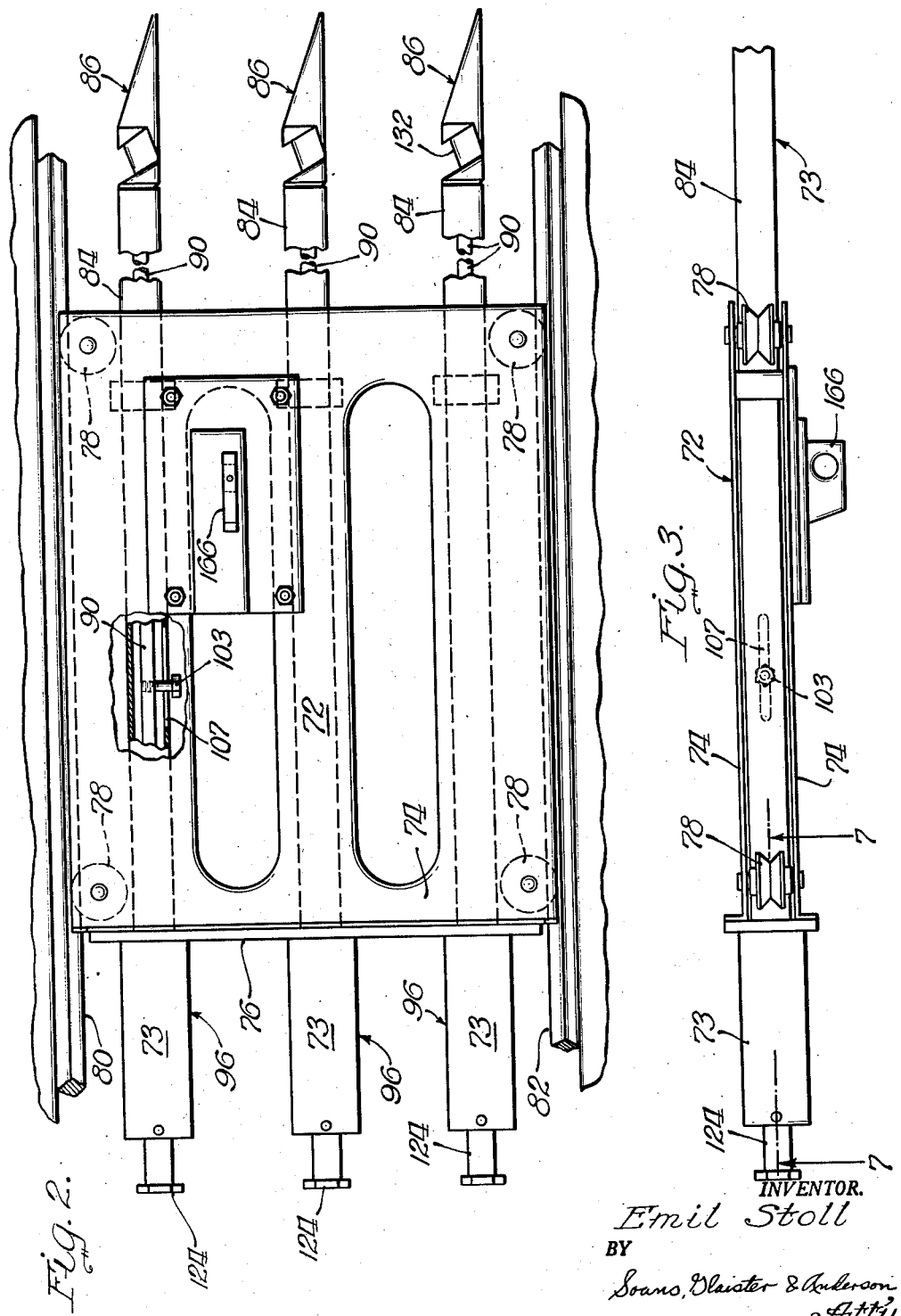

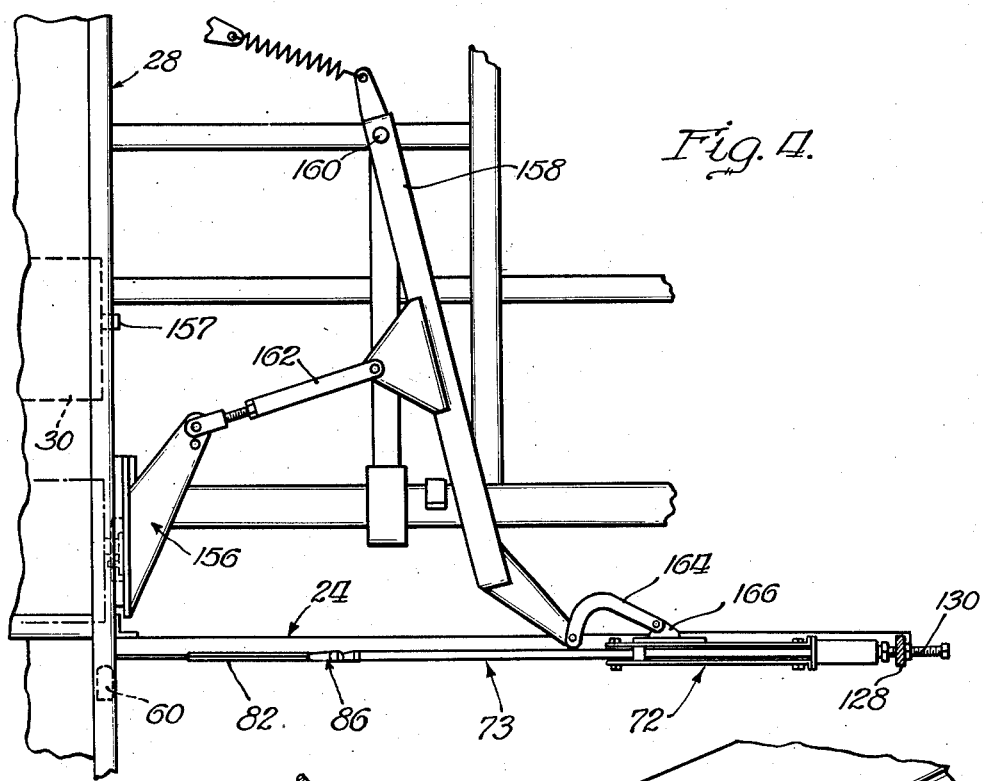
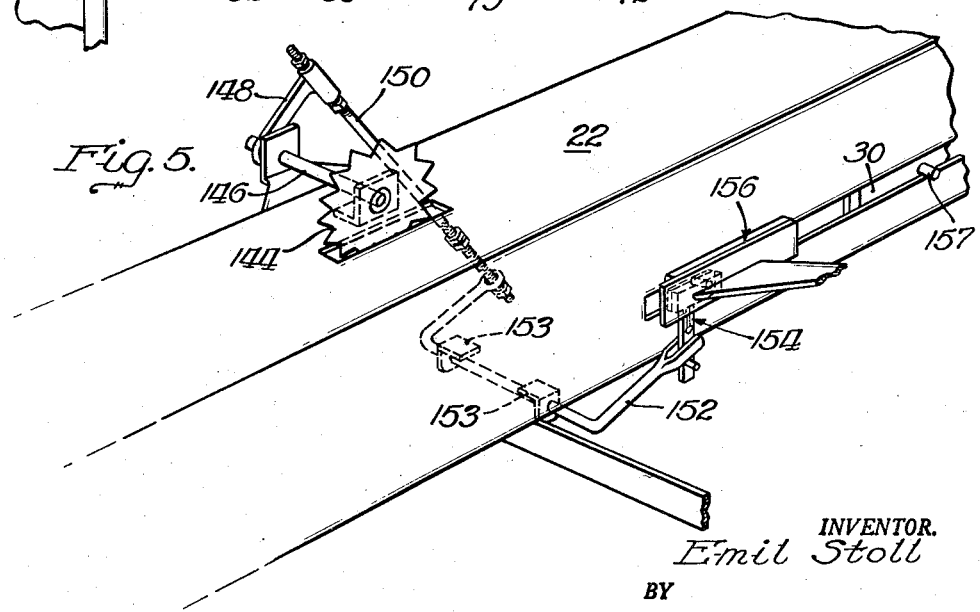

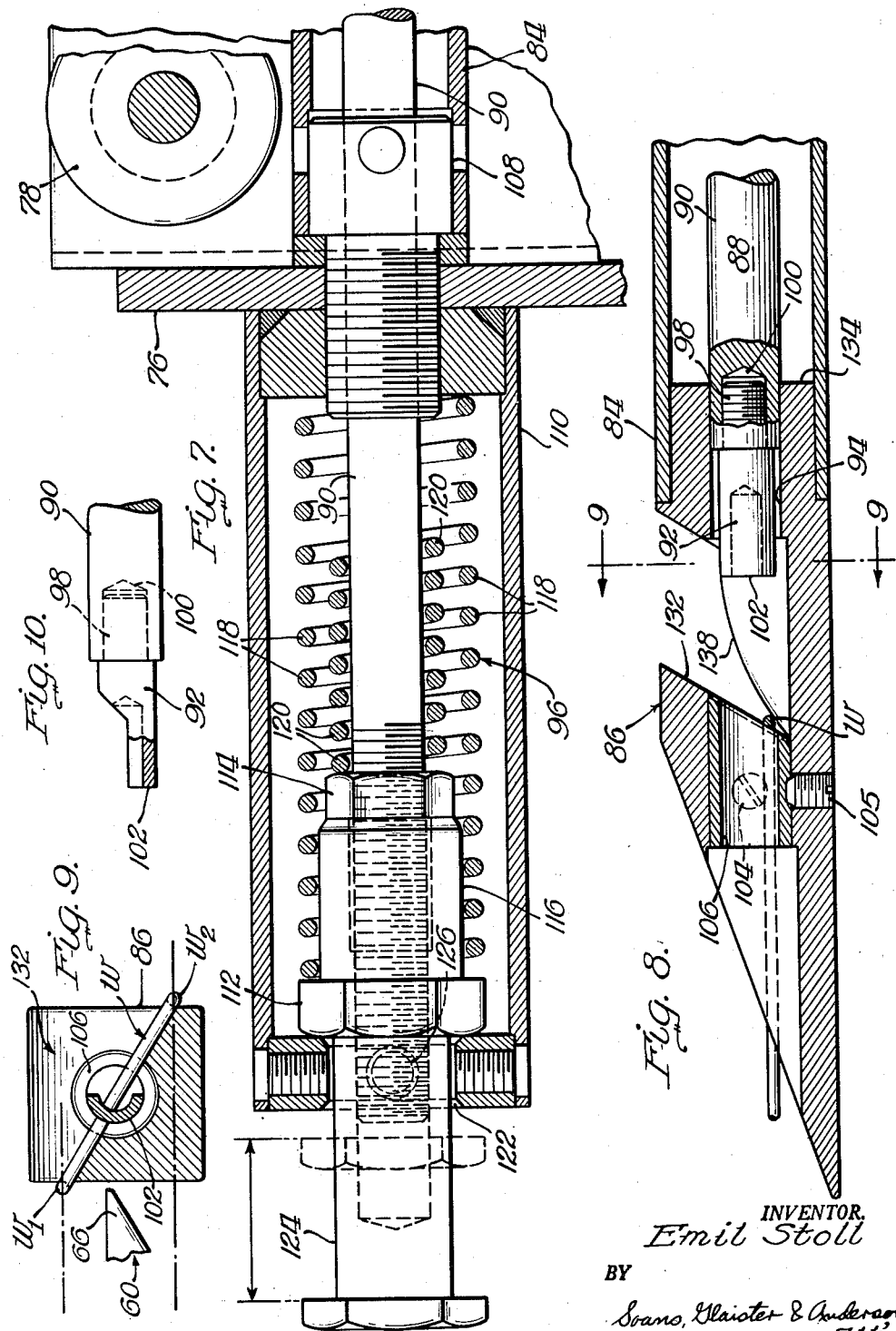

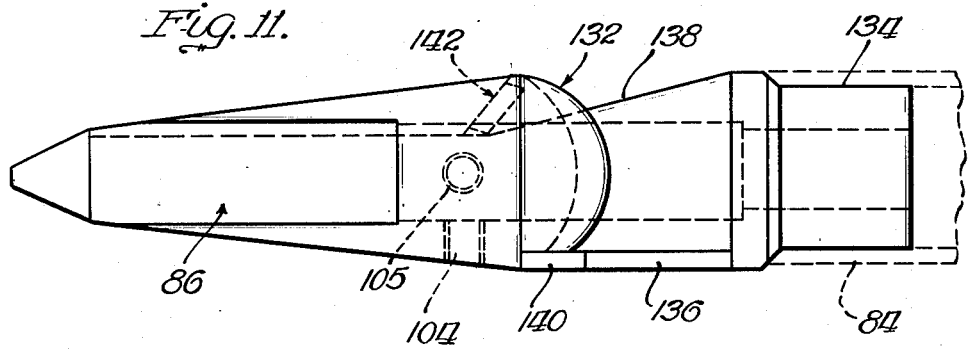
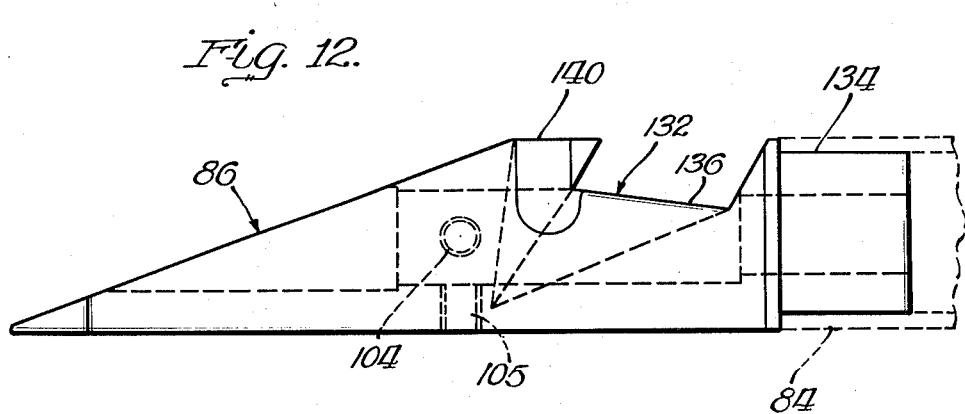
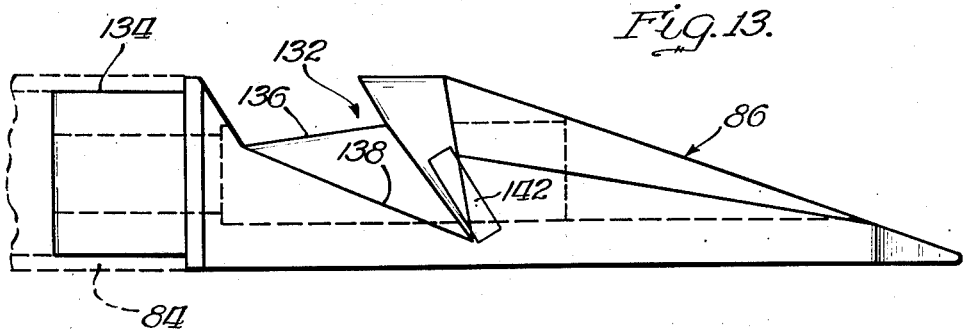

United States Patent Office 2,821,906
Patented Feb. 4, 1958

2,821,906

BALE TYING MECHANISM

Emil Stoll, Racine, Wis., assignor to J. I. Case Company, Racine, Wis., a corporation of Wisconsin Application August 26, 1954, Serial No. 452,347

7 Claims. (Cl. 100—24)

The present invention relates generally to balers and is more particularly directed to an improved means for positioning the tying strands around successive bales of material formed in the baler.

In the usual baling operation, particularly with wire-tying balers, the tying strands which have been passed across the front of the leading bale and then along one side thereof to the strand supply reels are pulled across the baling chamber in doubled form at the desired plane of separation between the formed leading bale and the succeeding bale which is in the process of being formed. After the doubled strands have been extended a desired distance beyond the side of the baling chamber, they are severed to thereby present one length of wire which is to be tied to the forward end of the strand around the leading bale, and to present another length of wire which extends across the chamber to the supply reel. The latter length of wire is then free to be moved along the baling chamber with the bale being formed, and provides the forward end of a strand which is to be subsequently tied around such bale.

Various means have been devised for sorting the severed strands which are to be disposed around the two successively formed bales in the above manner, but the known devices have not proven very satisfactory. At best such prior devices have involved complicated structure, which is usually either actuable by the strand positioning needle mechanism or is in some manner operated in timed relation to the needle mechanism. In either case the construction is expensive, both in initial cost and maintenance, and is not sufficiently reliable for extensive field operations.

The primary object of the present invention is to provide a novel and improved means for automatically passing a looped tying strand through a baling chamber in a manner affording vertical separation of the two runs of the loop. Another object of the invention is to provide means for automatically passing a looped tying strand through the compressed material in the baling chamber, at the desired plane of separation between successive bales, and for separating the two runs of the loop and severing the loop, so that one run may be moved forwardly in the chamber to be tied around the completed bale and the other run is retarded so as to be pressed against the side of the succeeding bale as it is being formed and moved forwardly in the chamber.

It is also an object of the present invention to provide an improved needle for passing a wire in looped form through compressed material, including a cutting means for said wire which is operable to sever the outer end of the looped wire along a single line, thereby eliminating the danger of leaving short cuts of wire.

Other objects and advantages of the invention will be made apparent as the disclosure progresses with respect to the accompanying 7 sheets of drawings, wherein:

Fig. 1 is a perspective view of a portion of a baler, illustrating the selected embodiment of the present invention.

Fig. 2 is an enlarged elevational view of the needle structure seen in Fig. 1, with parts broken away.

Fig. 3 is a top plan view of the structure in Fig. 2, with parts omitted.

Fig. 4 is a fragmentary, plan view of the operating means for the needle frame.

Fig. 5 is a perspective view of the baling chamber, reduced in scale, illustrating the bale gauge means which is associated with the needle operating means in Fig. 4.

Fig. 7 is an enlarged, sectional view taken along the line 7—7 in Fig. 3.

Fig. 8 is an enlarged, sectional view taken longitudinally of one of the needles.

Fig. 9 is a sectional view taken along the line 9—9 in Fig. 8.

Fig. 10 is a side view of a portion of the structure in Fig. 8, with parts broken away and in section.

Fig. 11 is a top plan view of the needle head seen in Fig. 8.

Fig. 12 is a side view of the structure in Fig. 11.

Fig. 13 is a view of the side of the structure in Fig. 11, opposite that shown in Fig. 12.

Fig. 14 is a top plan view of the separator block seen in Fig. 6.

Fig. 15 is an end view of the separator block, as taken from the right side in Fig. 14.

Figs. 16–18 are diagrammatic illustrations of the operation of the baler apparatus shown in the preceding drawings.

Figure 6:
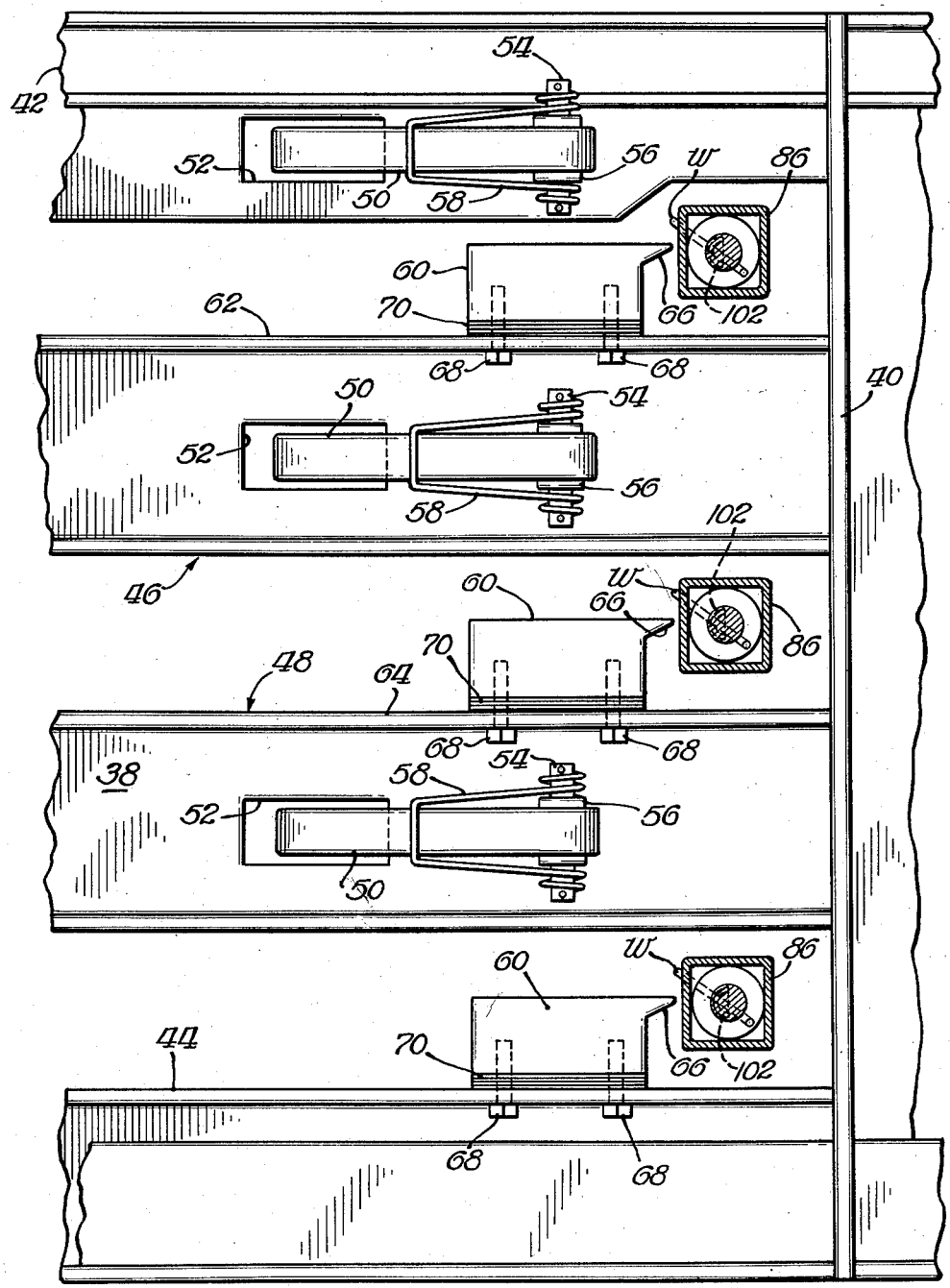
Fig. 6 is an enlarged, fragmentary view of the baling chamber at the position of entry of the wire-passing needles.

With reference to Fig. 1, it is seen that the structure chosen to illustrate the present invention comprises a mobile baler 20 having a longitudinally extending baling chamber 22 and a transversely extending frame structure 24 for supporting a pick-up unit (not shown). The transverse frame 24 also supports a needle assembly 26 which is disposed at right angles to the baling chamber 22. Since the present invention is directed to the means for passing the tying strand through the baling chamber, a more complete showing of the baler is believed unnecessary.

The illustrated baling chamber 22 includes a generally rectangular enclosure having a forward portion 28 wherein there is mounted a reciprocating plunger 30 (Fig. 16) for compressing the material as it is fed from the pick-up unit to the chamber. This forward chamber portion 28 is generally enclosed on all four sides to afford proper compression and formation of the material being baled. However, the portion of the baling chamber which extends to the rear of the machine is a generally open frame structure, as seen in Fig. 1. The top and bottom of this rearward chamber portion is formed by a pair of plate members 32, each of which is supported along opposite side edges thereof by a pair of angle members 34 fixed in rearwardly extending relation to the forward baler portion 28. The side walls of the rearward section of the baling chamber 22 include a pair of longitudinally extending, vertically spaced strap members 36, thereby providing openings along the side of the chamber which afford access to the strands of wire around the bale in the chamber for tying the ends of the strands together.

Adjacent the juncture of the open chamber portion just described and the plunger housing portion 28 there is mounted a pair of side plate structures 38 (Fig. 1), which are preferably fabricated to include elongated openings therein disposed to conform with the path of the needles through the chamber. Each of these plate structures include a pair of side members 40, a top mmeber 42, a bottom member 44, and a pair of intermediate channel members 46 and 48. As noted particularly in Fig. 6, the vertical web of the top member 42 and the web portions of the intermediate channel members 46 and 48 each have mounted thereon a spring biased hay dog 50 having a free end portion extending through an opening 52 in the plate structure into the bale chamber 22. Each of the dogs 50 comprises a pivot pin 54 at one end which is journaled in a suitable bearing 56 on the plate structure, and a spring 58 which is disposed around the pin 54 and across the dog 50 to bias the free end of the latter toward the bale chamber. These hay dogs 50 afford a plurality of wedges in the bale chamber, which act against the compressed material to prevent expansion thereof toward the front of the chamber.

On the side plate structure 38, which is mounted on the side of the bale chamber adjacent the needle frame 26 (Fig. 1), there is also mounted three separator elements in the form of blocks 60, the function of which will be more clearly described hereinafter. These separator blocks are mounted on the upper horizontal flange 62 and 64 (Fig. 6) of the intermediate channel members 46 and 48, respectively, and on the bottom member 44. The blocks 60 are generally rectangular in shape with one end and a corner portion thereof being of reduced size along the lower part of the block, to thereby provide a lip 66 (Figs. 14 and 15) which extends across the forward end and the adjoining inside corner of the block. The blocks are held in place on the side plate by a pair of bolts 68, and one or more shim plates 70 may be placed under each of the blocks to adjust the level of the lip 66.

As noted in Fig. 1, the needle assembly 26 is disposed for movement at right angles to the baling chamber 22 in close relation to the above described separator blocks 60. Looking also at Fig. 2, it is seen that the needle assembly 26 comprises a movable carriage 72 having three needles 73 mounted thereon in aligned, vertically spaced relation. The carriage 72 is formed of a pair of narrowly spaced apart plates 74 joined at one end by a plate 76, and the carriage includes a pair of rollers 78 at its top and bottom, in position for guided engagement with a pair of vertically spaced rails 80 and 82 fixed to the transversely extending frame 24.

Each of the needles 73 comprise an elongated tubular member 84 (Fig. 2) having a head portion 86 suitably fixed thereto at one end, and each needle includes a wire cutter 88 (Fig. 8) which is mounted within the tubular member 84. The wire cutter 88 includes an elongated rod 90 having a cutter element 92 detachably mounted at its forward end, and an adjustable spring biasing means 96 at the rear of the rod 90 for normally maintaining the cutter in its retracted position as seen in Fig. 8. The cutter element 92 is disposed for movement through an axial bore 94 in the shank portion of the needle head 86, to thereby cut a strand of wire being held by the needle.

As shown particularly in Figs. 8–10, the cutter element 92 includes a threaded shank portion 98, which is screwed into a threaded bore 100 in the end of the cutter rod 90, and a semi-circular tip 102 which is preferably of hardened steel. The forward part of the needle head 86 includes an enlarged extension of the bore 94, which has detachably fixed therein, as by the screws 104 and 105, a tubular insert 106 also of hardened steel. The cutter tip 102 is movable within the insert 106 to thereby sever a wire held by the needle head 86. And in this respect, it will be noted from Fig. 9 that the cutting action of the arcuate shaped tip 102, as it passes into the insert 106, is such that it severs the wire across a single plane. Consequently, there is no residual bit of wire to foul the needle head or to pass with the needle into the hay in the baling chamber 22.

It is necessary, of course, that the cutter tip 102 be properly positioned relative to the axis of the rod 92 to achieve the above described cut in the tying strand. In order to hold the cutting tip in such proper position, there is provided means for preventing rotation of the rod 90 comprising a screw 103 (Fig. 2) which is secured to an intermediate portion of the rod 90 and extends downwardly therefrom through a slotted opening 107 in the tubular member 84. Thus rotation of the cutter rod 90, which would result in a displacement of the cutter tip 102, is prevented.

The other end of the cutter rod 90 (Fig. 7) is slidably supported by a sleeve 108 having a reduced, externally threaded end portion disposed through an opening in the end plate 76, which is threadedly engaged with one end of a cylindrical housing 110 for the spring means 96. The cutter rod 90 extends through the center of the housing 110, and the free end of the rod is threaded for engagement with a pair of nuts 112 and 114 which are disposed at opposite ends of a collar 116 seated on the rod 90 within the housing 110. The nut 112 is positioned for engagement with the end of the housing 110 to limit the travel of the needle rod 90, and this nut also provides a seat for a coil spring 118 which extends to the opposite end of the housing 110. A shorter coil spring 120 is seated on the nut 114 to yieldably limit the movement of the cutter rod 90 as the rod moves inwardly of the tube 84.

The outer end of the housing 110 has an axial opening 122 therein through which projects the end of the cutter rod 90, and a bumper 124 is disposed through the opening 122 in engagement with the nut 112 and is detachably fixed to the rod by a set screw 126. As seen in Fig. 1, the outer end of the baler frame portion 24 includes a vertical post 128 having three vertically aligned bolts 130 extending through suitable threaded openings in the post. These bolts are positioned for engagement with the bumpers 124 on the end of each of the needles 73, as the carriage 72 moves away from the baling chamber 22, to thereby actuate the wire cutters 88. It is seen, therefore, that the length of travel of the cutter rods 90 may be varied by adjusting the axial position of the rods relative to the nuts 112 and 114, and the timing of the operation of the cutters 88 with the travel of the needle carriage 72 can be adjusted by changing the position of the bolts 130.

As seen particularly in Figs. 11–13, the needle head 86 is a tapered body terminating at its outer or forward end in a point and including a hook portion 132 adjacent its inner or rearward end. The inner end also includes a reduced shank portion 134 which is press fit or otherwise suitably secured within the end of the tubular member 84. The hook 132 of the needle is in the form of a transversely and forwardly inclined, triangular-shape cut in the rectangular base portion of the needle, which provides a rather shallow cut defined by the edge 136 (Fig. 12) at one side of the needle and a rather deep cut at the forward part of the hook as defined by the edge 138 (Fig. 13). Consequently, the strand of wire "W" engaged by the hook assumes a transversely inclined position as seen in Fig. 9. In order to provide for a maximum period of use for the hook, it is preferred that case hardened steel inserts 140 and 142 be disposed in the needle along the corner edges of the hook portion 132 where the tendency of the wire to bite into the metal is the greatest. As will be noted particularly in the description of the operation of the needles 73, the construction of the hook 132 is highly advantageous in that it affords both a vertical and a horizontal separation of the two runs of the strand of wire being grasped by the needle.

Movement of the needle assembly 26 transversely of the baling chamber 22 is effected by suitable means, such as is illustrated generally in Figs. 4 and 5. A saw-toothed gauge wheel 144 is rotatably mounted on top of the bale chamber 22 in position for engagement with the compressed material moving therethrough. As the gauge wheel 144 is rotated by the movement of the bale through the chamber, it effects rotation of its supporting shaft 146 and an arm 148 fixed to the shaft. The arm 148 has a lost motion connection, through a rod 150, with a bail-lever 152 having its bight portion journalled in a pair of supporting brackets 153 at the bottom of the baling chamber. When the gauge wheel 144 has rotated a distance equal to the length of a bale, the foregoing connection moves the lever 152 to thereby trip a latch 154 on the side of the chamber 22.

The release of the latch 154 effects an engagement between a sliding carriage structure 156 disposed along the side of the baling chamber and a pin 157 (Figs. 4 and 5) carried by the plunger 30 to thereby provide a movement forward of the baling chamber (upwardly in Fig. 4) of the sliding carriage structure 156. This movement of the carriage 156 affords a swinging motion of an arm 158 which is connected to the needle carriage 72, to thereby move the latter inwardly of the baling chamber. More particularly, the arm 158 is pivoted on the baler frame structure, by a pin 160, and is connected intermediate its ends to the sliding carriage 156 by a pitman 162. The free end of the arm 158 is pivotally connected through a bell crank 164 with a bracket 166 fixed to the forward side plate 74 of the needle carriage 72 (Fig. 2). As the sliding carriage 156 on the bale case reaches its forward limit, it is moved rearwardly and thereby swings the arm 158 away from the baling chamber 22 to return the needle assembly to its retracted position seen in Fig. 4.

Operation

Having in mind the above disclosed structure, a description of the operation thereof will be given in order to more clearly illustrate the principles of this invention. Although the description will be made with reference to a single tying strand for the material being baled, it will be understood that the illustrated embodiment contemplates the use of three such tying strands.

With reference particularly to Figs. 16–18, it will be seen that, as the leading bale of hay "A" moves forwardly in the baling chamber 22, the strand of wire "W," which has been manually threaded along the front and sides of the bale, pulls more wire from the reel "R" to thereby extend the strand along the entire side of the bale opposite the needles 73. As the rear end of the bale "A" reaches a position opposite the needles 73, the gauge wheel 144 (Fig. 5) has moved sufficiently to trip the needle drive mechanism and cause the needle to move across the baling chamber 22.

The needle 73 grasps the strand of wire on the opposite side of the chamber in its hook portion 132 and carries the wire back through the hay (Fig. 17). The bale "A" as well as the bale "B" being formed in the forward part of the chamber are, of course, being continuously moved rearwardly under the action of the baling plunger 30.

At this point it should be particularly noted that the described construction of the needle hook 132 positions the two runs of the loop, formed in the strand "W" by the withdrawal of the wire through the baling chamber, in vertically spaced relation to each other with the rearwardmost strand disposed at the higher level (Fig. 9). Furthermore, the disposition of the path of the needle 73 with respect to the lip 66 on the separator block 60 is such that, as the bales are moved rearwardly in the chamber 22, the rearwardmost run "$W_1$" of the loop passes over the top of the separator block 60, while the lower run "$W_2$" of the loop is positioned below the lip 66 on the separator block. Consequently, when the loop which has been drawn through the hay is cut, the upper run of wire "$W_1$" is atop the separator block 60 and can be readily detected as the proper wire end for tying to the projecting end of wire at the forward end of the completed bale "A." The lower run "$W_2$" is retained at a lower level by the lip 66 on the separator block, and the pressure of the rearwardly moving bale "B" will force this lower run along the side of the bale as the latter moves along the bale chamber.

The cutting of the wire which is grasped by the needle 73 is effected by the cutter 88 as the needle assembly 26 is moved to its fully retracted position seen in Fig. 1. As the carriage 72 is moved to the right along the rails 80 and 82, through the swinging movement of the arm 158 (Fig. 4), the bumper 124 at the end of the needle strikes the bolt 130 on the outer post 128. This effects relative movement between the cutter rod 90 and the tubular needle member 84, against the resistance of the spring 118 (Fig. 7) in the cylindrical housings 110, and forces the cutter element 102 into the insert 106 in the needle head 86 (Fig. 8) to thereby sever the wire held in the needle hook 132. As indicated previously, the particular construction of the cutting tip 102 and its disposition relative to the end loop in the tying strand W provides for severing the strand at a single point. Consequently, there are no loose bits of wire remaining after the cut to interfere with subsequent cutting operations or to possibly become lost in the hay to cause damage to the baler or injury to animals feeding on the hay.

It should be understood that the above-described action of the needle is quite rapid, since the needle actually penetrates the compressed hay to pick up the strand W and draw it across the baling chamber, while the baling plunger 30 continues the formation of the succeeding bale. The path of the needles is rearwardly of the end of the stroke for the plunger and, consequently, there is no opportunity for the latter to strike the needles. Correspondingly, there is no need to time the operation of the needles between the strokes of the plunger or provide complicated safety means to prevent damage to the needles by the plunger.

Although shown and described with respect to a particular embodiment, it will be apparent that the principles of the present invention may be employed with respect to other constructions.

For example, the disclosed embodiment has been described in connection with the handling of bale tying strands of wire, whereas it will be readily apparent to those skilled in the art that other types of tying strands, such as twine, can be similarly handled to considerable advantage by employing the principles of this invention.

I claim:

1. In a baler having an elongated baling chamber and a plunger operable in said chamber to compress material therein for forming a series of bales to be bound with a tying strand and moving serially through said chamber, a needle for passing a loop of said strand transversely through the chamber, one run of said loop forming part of the binding of one bale and the other run of said loop forming part of the binding of the next adjacent bale, said needle having a transversely inclined portion adapted to grasp said loop in a manner to hold one run thereof vertically spaced in relation to the other run, and means on said baling chamber at a level intermediate the runs of said loop and positioned to be introduced between said vertically spaced runs by virtue of the movement of said bales to distinguish the run intended to form the binding of one bale from the run forming the binding of the next bale to thereby prevent inadvertent confusion of one run with the other.

2. In a baler having a frame structure, an elongated baling chamber mounted on the frame, and having a plunger operable to compress material in the chamber, the improvement comprising means for passing a loop of flexible bale tying material transversely through the chamber in a manner affording vertical separation of the two runs of the loop, said means comprising a needle unit mounted on the frame for reciprocation through a path transversely of the baling chamber, said needle unit including a head portion defining a hook having a supporting surface inclined transversely of the longitudinal axis of said needle unit and disposed for engagement with the bight of the loop, and a separator block on the side of said chamber adjacent said needle unit and in proximate relation to the path thereof, said separator block including a lip disposed intermediate the upper and lower level of the inclined loop supporting surface of said needle head, whereby the tying material is picked up by said needle unit and moved across said chamber and past said separator block, with the bight of the loop thus formed disposed around said hook to position one run of the loop above said lip on the separator block and the other run below said lip.

3. In a baler having a frame structure, an elongated horizontal baling chamber mounted on the frame, and having a plunger operable to compress material in the chamber as it moves the material from one end of said baling chamber toward the other end thereof, the improvement comprising a needle unit mounted on the frame at one side of said baling chamber for reciprocation through a path transversely of the baling chamber, the end of said needle unit nearest the baling chamber including a hook having a transversely inclined wire supporting surface, the upper level of said inclined wire supporting surface being on the side of the needle facing said other end of the baling chamber, and a generally horizontally disposed separator element carried by said baling chamber along said one side thereof, said separator element being disposed in proximate relation to the path of said needle unit toward said other end of said baling chamber and intermediate the upper and lower levels of said inclined wire supporting surface, whereby said needle unit moves through the bale chamber for engagement by said hook with a strand of wire on the other side of said chamber and passes the strand across the chamber in a loop with one run thereof disposed at a higher level than the other run, and whereby continued movement of the material through the chamber advances said loop to a position wherein said one run overlies said separator element and said other run is below said separator element.

4. In combination with a needle unit comprising an elongated tubular member having at one end a strand-engaging means, said strand-engaging means including a transverse recess defining a hook portion and a longitudinal bore intersecting the strand supporting surface provided by the transverse recess, the bore in said strand-engaging means communicating with the hollow center portion of said elongated tubular member, a cutter unit including an elongated rod disposed in said tubular member for movement relative thereto, and a cutter element fixed to the end of said rod for axial movement through the bore in said strand-engaging means, said cutter element being disposed to intersect the strand supporting surface of said transverse recess at an angle and along substantially a single line extending longitudinally of said tubular member, whereby a strand held by said strand-engaging means is divided at a single point therealong by the movement of said cutter unit.

5. In combination with a needle unit for use with a wire-tying baler, said needle unit comprising an elongated tubular member terminating at one end in a hook portion including an upwardly facing, transversely extending groove having a transversely inclined bottom surface, said hook portion also including means defining a bore extending longitudinally from said one end of said tubular member and across said inclined bottom surface to a position beyond the groove, a cutter unit including an elongated rod disposed in said tubular member for movement relative thereto, and a cutter element fixed to one end of said rod for movement therewith relative to the bore in said hook portion, said cutter being disposed to move across said inclined bottom in essentially a single line extending longitudinally of said tubular member, whereby a wire disposed within said groove and supported on said inclined surface will be cut transversely at a single point on the wire.

6. In a baler having a frame, an elongated baling chamber mounted on the frame, and a plunger operable in said chamber to compress the material therein, the combination of means for passing wire transversely through the chamber, said means comprising a needle unit mounted on the frame for movement across the baling chamber, said needle unit comprising an elongated tubular member having at one end a needle head including a hook portion defined by a transverse groove formed therein, said transverse groove having a transversely inclined bottom surface, said needle head also including means defining an axial bore communicating with the hollow central portion of said tubular member and intersecting the bottom surface of the transverse groove in said needle head, a cutter unit including an elongated rod disposed in said tubular member for movement relative thereto, a cutter element fixed to one end of said rod for movement through the axial bore in said needle head, said cutter element being disposed for movement across the bottom surface of the transverse groove in said needle head so as to intersect the bottom surface along a single line extending longitudinally of said tubular member, and a separator block on said baling chamber adjacent the path of said needle unit and including a ledge portion extending toward the path of said needle unit and disposed at a level intermediate the upper end lower levers of the inclined surface of the groove in said needle head, whereby the transverse groove in said needle head engages a strand of wire on one side of said baling chamber and passes the strand across the chamber in loop form with one run of the loop being disposed above the other run, and whereby the movement of the material in the chamber by the plunger moves the upper run of the loop over said ledge on the separator block and the lower run below said ledge, so that operation of said cutter unit will free said runs of the looped tying strand to pass above and below said ledge.

7. In a baler having an elongated baling chamber and a plunger operable in said chamber to compress material therein, a needle for passing a loop of tying strand transversely through the chamber, said needle having a portion adapted to engage said loop in a manner to hold the runs in spaced relation to each other with the portion of the runs adjacent the needle being disposed generally in a plane which is inclined with respect to the direction of the movement of the material in the chamber, and a separator element on said chamber adjacent the path of said needle, said separator element being disposed intermediate the spaced positions of the two runs of the loop as determined by said needle portion, whereby said separator element is disposed between said runs as the latter are moved along the chamber with the material therein by the action of said plunger.

References Cited in the file of this patent

UNITED STATES PATENTS

| 206,865 | Dederick | Aug. 13, 1875 |
| 787,008 | Taylor | Apr. 11, 1905 |
| 2,619,028 | Jay | Nov. 25, 1952 |
| 2,760,429 | Skromme | Aug. 28, 1956 |

FOREIGN PATENTS

| 138,012 | Australia | July 18, 1950 |